United States Patent
Cohen et al.

(10) Patent No.: US 10,690,380 B2
(45) Date of Patent: Jun. 23, 2020

(54) SOLAR WATER-HEATING SYSTEM AND PANEL THEREOF

(71) Applicant: Magen Eco Energy A.C.S Ltd, D N Hanegev (IL)

(72) Inventors: Rotem Cohen, Holon (IL); Ilan Shleifer, Kibbutz Magen (IL); Michael Sessler, Ein Habsor (IL); Michel Ben Gavriel Plaschkes, Kibbutz Magen (IL)

(73) Assignee: MAGEN ECO ENERGY A.C.S LTD, D N Hanegev (IL)

( * ) Notice: Subject to any disclaimer, the term of this patent is extended or adjusted under 35 U.S.C. 154(b) by 408 days.

(21) Appl. No.: 15/418,404

(22) Filed: Jan. 27, 2017

(65) Prior Publication Data

US 2017/0219249 A1    Aug. 3, 2017

(30) Foreign Application Priority Data

Feb. 1, 2016  (IL) .......................................... 243897

(51) Int. Cl.

| | |
|---|---|
| *F24S 10/75* | (2018.01) |
| *F24S 80/30* | (2018.01) |
| *F24S 10/70* | (2018.01) |
| *F24S 25/61* | (2018.01) |
| *F24S 25/60* | (2018.01) |

(52) U.S. Cl.
CPC ............. *F24S 10/75* (2018.05); *F24S 10/742* (2018.05); *F24S 10/753* (2018.05); *F24S 25/61* (2018.05); *F24S 80/30* (2018.05); *F24S 2010/71* (2018.05); *F24S 2010/751* (2018.05); *F24S 2025/6003* (2018.05); *Y02E 10/44* (2013.01); *Y02E 10/47* (2013.01)

(58) Field of Classification Search
CPC ............. F24S 10/75; F24S 80/30; F24S 25/61
USPC .................................................. 126/651–677
See application file for complete search history.

(56) References Cited

U.S. PATENT DOCUMENTS

| | | | | |
|---|---|---|---|---|
| 3,269,362 | A | * | 8/1966 | Engler .................. F22B 37/142 122/235.11 |
| 4,180,055 | A | * | 12/1979 | Hudnall .................. F24S 10/40 126/658 |
| 6,082,353 | A | * | 7/2000 | van Doorn ............. B21D 39/06 126/659 |
| 2012/0186577 | A1 | * | 7/2012 | Pelan .................... F28F 9/0217 126/663 |

(Continued)

OTHER PUBLICATIONS

Szumlanski, Comparing Solar Pool Heating Panels Types, Florida Solar Design Group, 6 pages, Feb. 10, 2015.

(Continued)

*Primary Examiner* — Vivek K Shirsat
(74) *Attorney, Agent, or Firm* — Vorys, Sater, Seymour and Pease LLP

(57) ABSTRACT

A solar water-heating panel is provided, comprising a plurality of risers configured for utilizing solar radiation impinging thereon to heat a fluid therein. Each riser comprises a riser wall defining a fluid path for flow therethrough of the fluid. The panel further comprises one or more headers for facilitating delivery of the fluid between the panel and an external source of the fluid. The risers are parallely-arranged and separate from one another, and each comprises a longitudinal fin projecting sidewardly therefrom toward, and contacting, an adjacent riser.

19 Claims, 5 Drawing Sheets

(56) References Cited

U.S. PATENT DOCUMENTS

2013/0239951 A1* 9/2013 Grandinetti ........... F24S 10/746
126/652
2015/0377515 A1* 12/2015 Russell ................... B23P 15/26
126/646

OTHER PUBLICATIONS

Szumlanski, Day 2: Full Body Tube & Web Design, Florida Solar Design Group, 3 pages, Dec. 26, 2015.
Solar Pool Heating Companies in Southwest Florida, Florida Solar Design Group, 7 pages, Apr. 20, 2015.

* cited by examiner

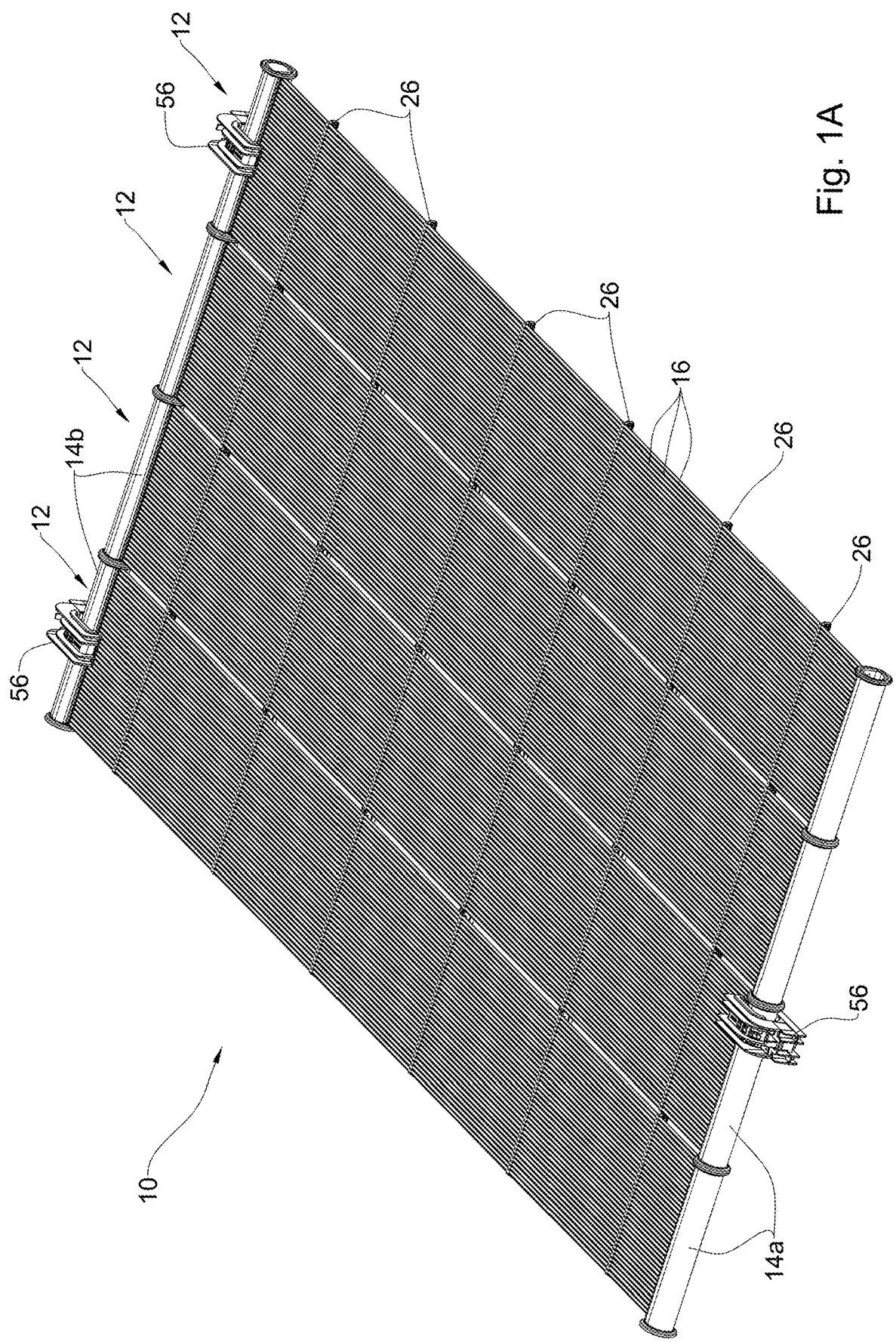

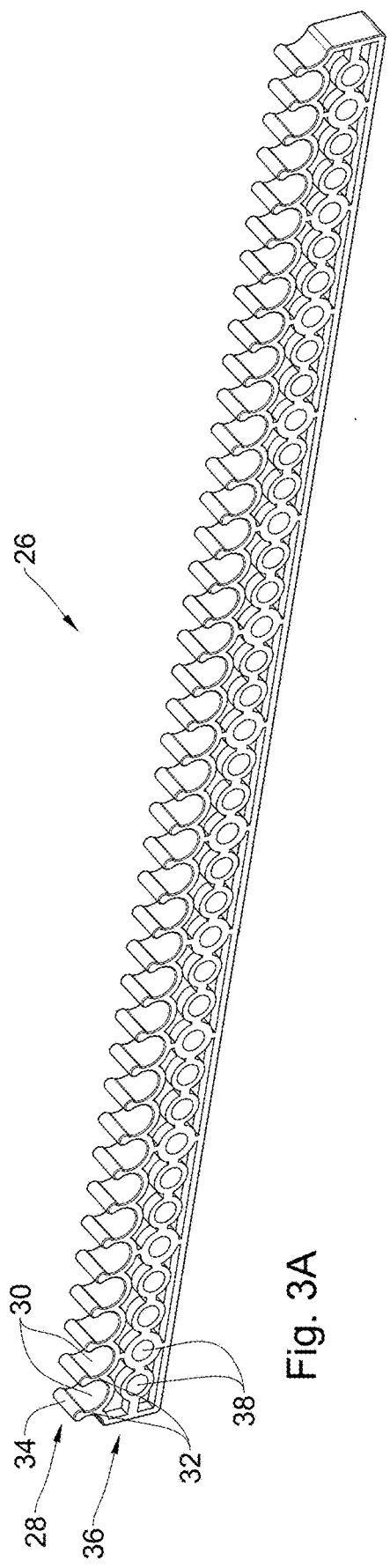
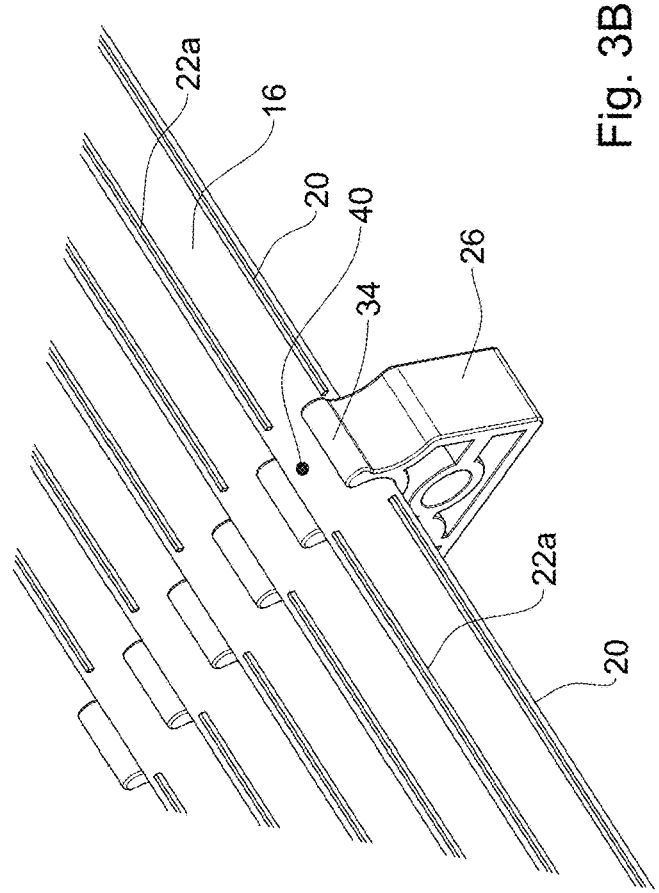

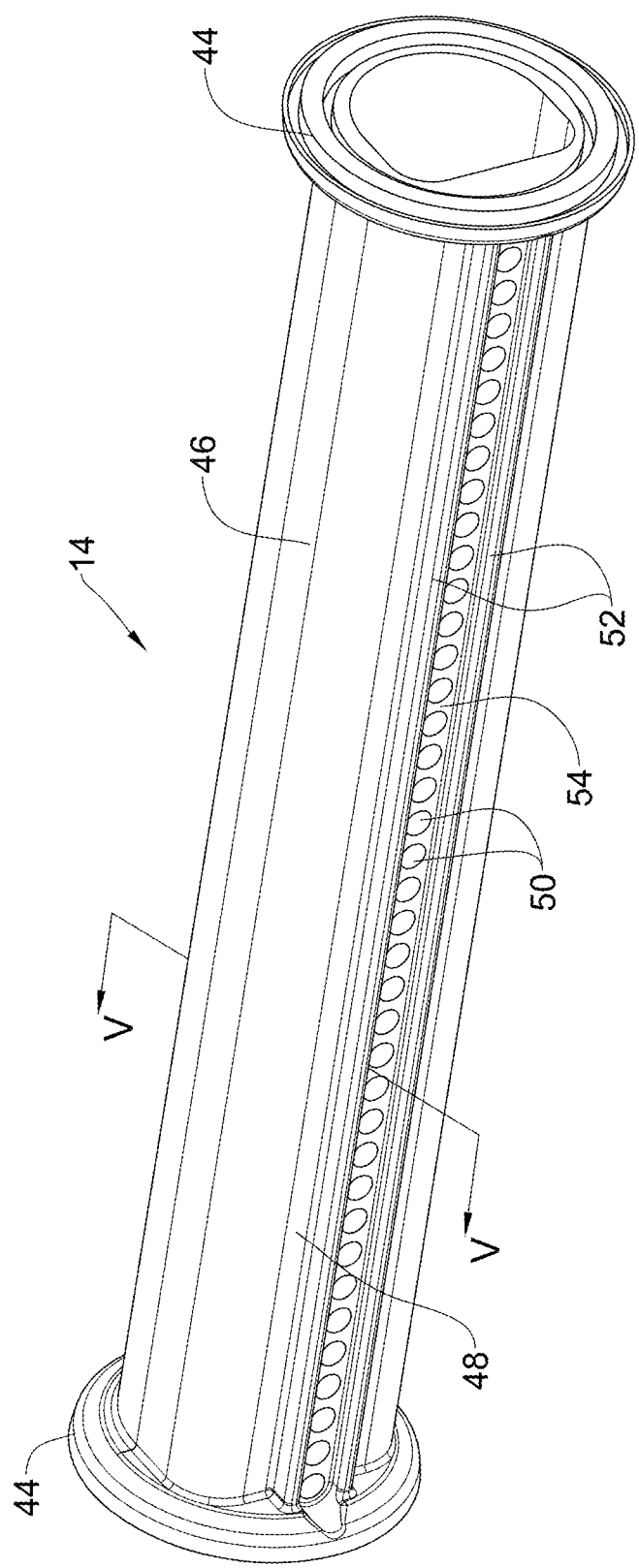
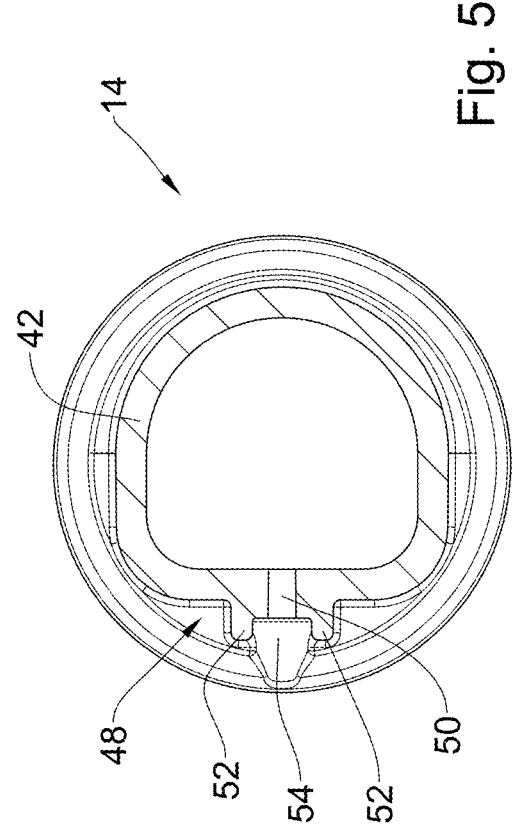
Fig. 4
Fig. 5

SOLAR WATER-HEATING SYSTEM AND PANEL THEREOF

CROSS-REFERENCE TO PRIOR APPLICATION

This application claims priority from Israel patent application IL 243897, filed on Feb. 1, 2016, the full contents of which are incorporated herein by reference.

TECHNOLOGICAL FIELD

The presently disclosed subject matter relates to solar water-heating systems. In particular, it relates to such systems designed to utilize the heat of solar radiation impinging thereon to heat water, e.g., flowing therethrough.

BACKGROUND

The use of solar water-heaters for various uses is well-known. They are utilized in many applications, including, but not limited to, swimming pool, supplying residential hot water, etc. They are typically installed on roofs, which, inter alia, provides a location with minimal obstacles to solar radiation impinging thereon.

A typical system comprises one or more thin tubes carrying water to be heated. The tubes are positioned so as to be exposed to solar radiation. During daylight hours, water which flows through the tubes is heated by the sunlight. The flow may be forced (e.g., by employing a pump or other suitable apparatus), and/or the system may be designed to take advantage of natural properties of water (e.g., the difference in specific gravities between water of different temperatures) to induce the flow.

SUMMARY

According to one aspect of the presently disclosed subject matter, there is provided a solar water-heating panel comprising a plurality of risers configured for utilizing solar radiation impinging thereon to heat a fluid therein, and each comprising a riser wall defining a fluid path for flow therethrough of the fluid, the panel further comprising one or more headers for facilitating delivery of the fluid between the panel and an external source of the fluid, wherein the risers are parallely-arranged and separate from one another, and each comprises a longitudinal fin projecting sidewardly therefrom toward, and contacting, an adjacent riser (i.e., the fin projects sidewardly toward an adjacent riser and contacts it); wherein each of the risers further comprises a baffle formed longitudinally along its exterior and projecting upwardly therefrom; and wherein each of the headers is characterized, along at least an interface portion thereof, by a lateral cross-section having at least one non-convex exterior portion.

Each of the risers may further comprise an auxiliary baffle formed longitudinally along its exterior and projecting downwardly therefrom.

Each of the baffles may be formed halfway between adjacent risers.

The thickness of each of the baffles may be between about 40% and about 60% of the thickness of the riser wall.

The height of each of the baffles may be between about 50% and about 100% of the thickness of the riser wall.

The thickness of each of the baffles may be at least about 50% of the height thereof.

Each of the risers may comprise two longitudinal fins formed opposite one another, each of the fins contacting a fin of the adjacent riser.

The fins may be formed such that distal-most contacting surfaces thereof are substantially planar and are disposed, in lateral cross-section, perpendicularly to a radius of its respective riser.

The thickness of each of the fins may be between about 40% and about 60% of the thickness of the riser wall.

The height of each of the fins may be between about 50% and about 100% of the thickness of the riser wall.

The thickness of each of the fins may be at least about 50% of the height thereof.

The panel may further comprise one or more support elements having a gripping portion retaining therein a plurality of the risers.

Exterior portions of the risers within the gripping portion may be free of elements projecting therefrom.

The risers may be free of the fins along portions within the gripping portion.

Each of the support elements may further comprise a mounting arrangement configured to facilitate attachment thereof to a surface.

The mounting arrangement may comprise a plurality of through-going apertures formed parallely with the risers.

Each of the headers may be formed with a plurality of openings for bringing the risers into fluid communication therewith.

The openings may be formed through the non-convex exterior portion.

Each of the headers may comprise a pair a parallely-disposed ridges defining therebetween a channel, the openings being formed within the channel.

The channel may be configured to (i.e., formed having a size suitable to) snuggly receive therein edges of the risers.

Each of the headers may comprise connecting portions formed at each end thereof, configured to facilitate connection to an adjacent header for fluid communication therewith.

The connecting portions may further facilitate connection to a pipe for fluid communication therewith.

The interface portion may span between the connection portions.

The lateral cross-section of the exterior of the interface portion may be generally D-shaped, thereby defining the non-convex exterior portion.

The panel may comprise a header at each end of the risers, one constituting an inlet header and one constituting an outlet header thereof.

The panel may further comprise one or more mounting clamps retaining at least one of the headers, the mounting clamp comprising an interface surface bearing against the interface portions of the header.

At least the risers and/or headers may be made from a polyolefin.

According to another aspect of the presently disclosed subject matter, there is provided a solar water-heating panel comprising a plurality of risers configured for utilizing solar radiation impinging thereon to heat a fluid therein, and each comprising a riser wall defining a fluid path for flow therethrough of the fluid, the panel further comprising one or more headers for facilitating delivery of the fluid between the panel and an external source of the fluid, wherein the risers are parallely-arranged and separate from one another, and each comprises a longitudinal fin projecting sidewardly therefrom toward, and contacting, an adjacent riser.

Each of the risers may comprise two longitudinal fins formed opposite one another, each of the fins contacting a fin of the adjacent riser.

The fins may be formed such that distal-most contacting surfaces thereof are substantially planar and are disposed, in lateral cross-section, perpendicularly to a radius of its respective riser.

The thickness of each of the fins may be between about 40% and about 60% of the thickness of the riser wall.

The height of each of the fins may be between about 50% and about 100% of the thickness of the riser wall.

The thickness of each of the fins may be at least about 50% of the height thereof.

Each of the risers may further comprise a baffle formed longitudinally along its exterior and projecting upwardly therefrom.

Each of the risers may further comprise an auxiliary baffle formed longitudinally along its exterior and projecting downwardly therefrom.

Each of the baffles may be formed halfway between adjacent risers.

The thickness of each of the baffles may be between about 40% and about 60% of the thickness of the riser wall.

The height of each of the baffles may be between about 50% and about 100% of the thickness of the riser wall.

The thickness of each of the baffles may be at least about 50% of the height thereof.

The panel may further comprise one or more support elements having a gripping portion retaining therein a plurality of the risers.

Exterior portions of the risers within the gripping portion may be free of elements projecting therefrom.

The risers may be free of the fins along portions within the gripping portion.

Each of the support elements may further comprise a mounting arrangement configured to facilitate attachment thereof to a surface.

The mounting arrangement may comprise a plurality of through-going apertures formed parallely with the risers.

The risers may be made from a polyolefin.

Each of the headers may be characterized, along at least an interface portion thereof, by a lateral cross-section having at least one non-convex exterior portion.

Each of the headers may be formed with a plurality of openings for bringing the risers into fluid communication therewith.

The openings may be formed through the non-convex exterior portion.

Each of the headers may comprise a pair a parallely-disposed ridges defining therebetween a channel, the openings being formed within the channel.

The channel may be configured to (i.e., formed having a size suitable to) snuggly receive therein edges of the risers.

Each of the headers may comprise connecting portions formed at each end thereof, configured to facilitate connection to an adjacent header for fluid communication therewith.

The connecting portions may further facilitate connection to a pipe for fluid communication therewith.

The interface portion may span between the connection portions.

The lateral cross-section of the exterior of the interface portion may be generally D-shaped, thereby defining the non-convex exterior portion.

The panel may comprise a header at each end of the risers, one constituting an inlet header and one constituting an outlet header thereof.

The panel may further comprise one or more mounting clamps retaining at least one of the headers, the mounting clamp comprising an interface surface bearing against the interface portions of the header.

According to a further aspect of the presently disclosed subject matter, there is provided a solar water-heating panel comprising a plurality of risers configured for utilizing solar radiation impinging thereon to heat a fluid therein, and each comprising a riser wall defining a fluid path for flow therethrough of the fluid, the panel further comprising one or more headers for facilitating delivery of the fluid between the panel and an external source of the fluid, wherein each of the headers is characterized, along at least an interface portion thereof, by a lateral cross-section having at least one non-convex exterior portion.

Each of the headers may be formed with a plurality of openings for bringing the risers into fluid communication therewith.

The openings may be formed through the non-convex exterior portion.

Each of the headers may comprise a pair a parallely-disposed ridges defining therebetween a channel, the openings being formed within the channel.

The channel may be configured to (i.e., formed having a size suitable to) snuggly receive therein edges of the risers.

Each of the headers may comprise connecting portions formed at each end thereof, configured to facilitate connection to an adjacent header for fluid communication therewith.

The connecting portions may further facilitate connection to a pipe for fluid communication therewith.

The interface portion may span between the connection portions.

The lateral cross-section of the exterior of the interface portion may be generally D-shaped, thereby defining the non-convex exterior portion.

The panel may comprise a header at each end of the risers, one constituting an inlet header and one constituting an outlet header thereof.

The panel may further comprise one or more mounting clamps retaining at least one of the headers, the mounting clamp comprising an interface surface bearing against the interface portions of the header.

The headers may be made from a polyolefin.

The risers may be parallely-arranged and separate from one another, each comprising a longitudinal fin projecting sidewardly therefrom toward, and contacting, an adjacent riser.

Each of the risers may comprise two longitudinal fins formed opposite one another, each of the fins contacting a fin of the adjacent riser.

The fins may be formed such that distal-most contacting surfaces thereof are substantially planar and are disposed, in lateral cross-section, perpendicularly to a radius of its respective riser.

The thickness of each of the fins may be between about 40% and about 60% of the thickness of the riser wall.

The height of each of the fins may be between about 50% and about 100% of the thickness of the riser wall.

The thickness of each of the fins may be at least about 50% of the height thereof.

Each of the risers may further comprise a baffle formed longitudinally along its exterior and projecting upwardly therefrom.

Each of the risers may further comprise an auxiliary baffle formed longitudinally along its exterior and projecting downwardly therefrom.

Each of the baffles may be formed halfway between adjacent risers.

The thickness of each of the baffles may be between about 40% and about 60% of the thickness of the riser wall.

The height of each of the baffles may be between about 50% and about 100% of the thickness of the riser wall.

The thickness of each of the baffles may be at least about 50% of the height thereof.

The panel may further comprise one or more support elements having a gripping portion retaining therein a plurality of the risers.

Exterior portions of the risers within the gripping portion may be free of elements projecting therefrom.

Each of the support elements may further comprise a mounting arrangement configured to facilitate attachment thereof to a surface.

The mounting arrangement may comprise a plurality of through-going apertures formed parallely with the risers.

According to a still further aspect of the presently disclosed subject matter, there is provided a solar water-heating panel comprising a plurality of risers configured for utilizing solar radiation impinging thereon to heat a fluid therein, and each comprising a riser wall defining a fluid path for flow therethrough of the fluid, the panel further comprising one or more headers for facilitating delivery of the fluid between the panel and an external source of the fluid, wherein each of the risers further comprises a baffle formed longitudinally along its exterior and projecting upwardly therefrom.

Each of the risers may further comprise an auxiliary baffle formed longitudinally along its exterior and projecting downwardly therefrom.

Each of the baffles may be formed halfway between adjacent risers.

The thickness of each of the baffles may be between about 40% and about 60% of the thickness of the riser wall.

The height of each of the baffles may be between about 50% and about 100% of the thickness of the riser wall.

The thickness of each of the baffles may be at least about 50% of the height thereof.

The risers may be parallely-arranged and separate from one another, each comprising a longitudinal fin projecting sidewardly therefrom toward, and contacting, an adjacent riser.

Each of the risers may comprise two longitudinal fins formed opposite one another, each of the fins contacting a fin of the adjacent riser.

The fins may be formed such that distal-most contacting surfaces thereof are substantially planar and are disposed, in lateral cross-section, perpendicularly to a radius of its respective riser.

The thickness of each of the fins may be between about 40% and about 60% of the thickness of the riser wall.

The height of each of the fins may be between about 50% and about 100% of the thickness of the riser wall.

The thickness of each of the fins may be at least about 50% of the height thereof.

The panel may further comprise one or more support elements having a gripping portion retaining therein a plurality of the risers.

Exterior portions of the risers within the gripping portion may be free of elements projecting therefrom.

Each of the support elements may further comprise a mounting arrangement configured to facilitate attachment thereof to a surface.

The mounting arrangement may comprise a plurality of through-going apertures formed parallely with the risers.

The risers may be made from a polyolefin.

Each of the headers may be characterized, along at least an interface portion thereof, by a lateral cross-section having at least one non-convex exterior portion.

Each of the headers may be formed with a plurality of openings for bringing the risers into fluid communication therewith.

The openings may be formed through the non-convex exterior portion.

Each of the headers may comprise a pair a parallely-disposed ridges defining therebetween a channel, the openings being formed within the channel.

The channel may be configured to (i.e., formed having a size suitable to) snuggly receive therein edges of the risers.

Each of the headers may comprise connecting portions formed at each end thereof, configured to facilitate connection to an adjacent header for fluid communication therewith.

The connecting portions may further facilitate connection to a pipe for fluid communication therewith.

The interface portion may span between the connection portions.

The lateral cross-section of the exterior of the interface portion may be generally D-shaped, thereby defining the non-convex exterior portion.

The panel may comprise a header at each end of the risers, one constituting an inlet header and one constituting an outlet header thereof.

The panel may further comprise one or more mounting clamps retaining at least one of the headers, the mounting clamp comprising an interface surface bearing against the interface portions of the header.

According to a still further aspect of the presently disclosed subject matter, there is provided a solar water-heating system comprising a plurality of panels according to any one of the preceding claims.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which:

FIG. 1A is a perspective view of a solar water-heating system according to the presently disclosed subject matter;

FIG. 3A is a perspective view of a support element of the panel illustrated in FIG. 1B;

FIG. 3B is a close-up view of the area indicated at 'A' in FIG. 1B;

FIG. 4 is a perspective view of a header of the panel illustrated in FIG. 1B;

FIG. 5 is a cross-sectional view taken at line V-V in FIG. 4; and

DETAILED DESCRIPTION

Figure 1B:
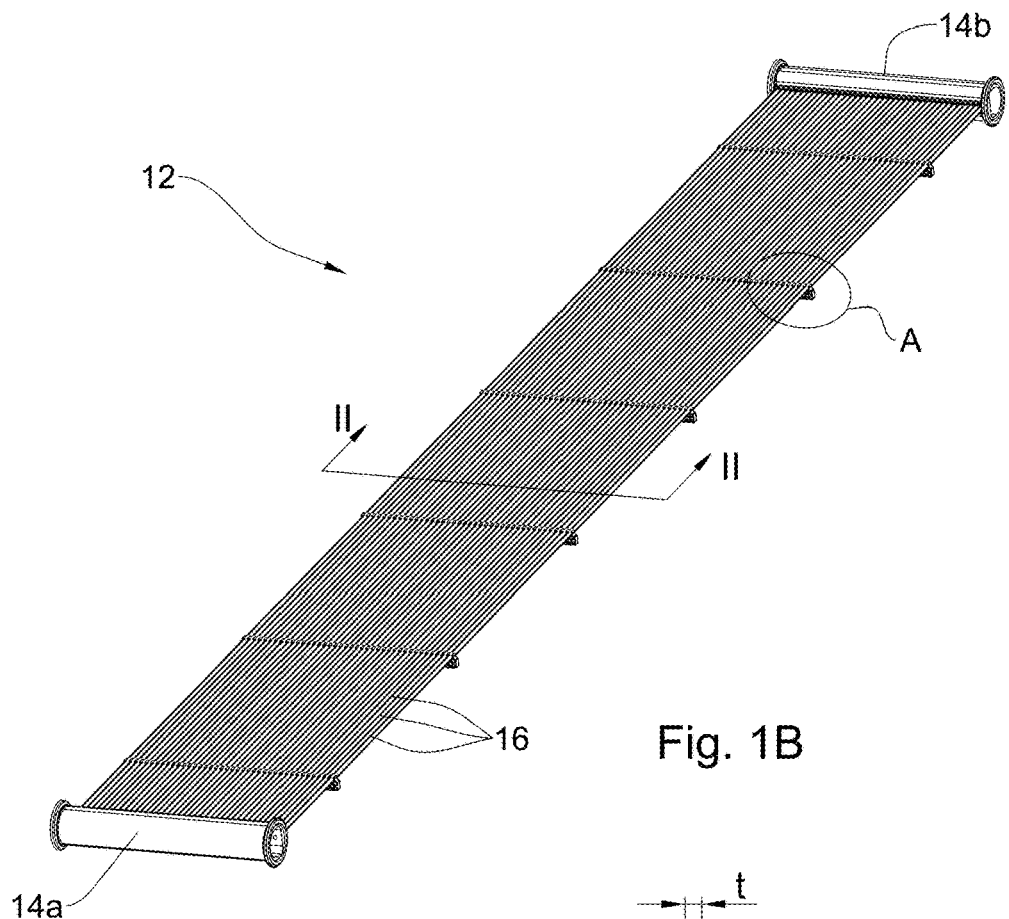
FIG. 1B is a perspective view of a panel of the solar water-heating system illustrated in FIG. 1A.

As illustrated in FIG. 1A, there is provided a system, which is generally indicated at 10, for heating water utilizing solar radiation impinging thereupon. The system 10 may be configured for mounting, e.g., on the roof of a structure. It may be connected to an external apparatus (not illustrated) which facilitates delivery of water to the system 10 for heating, and supplying water heated within the system, e.g., in order to heat water within a swimming pool or other similar body of water.

The system 10 comprises a plurality of panels 12 (an individual panel illustrated in FIG. 1B for convenience), each of which comprises inlet and outlet headers 14a, 14b (herein the present disclosure, the reference numeral 14 will be used to refer to the headers 14a and 14b collectively) and a plurality of risers 16 in fluid communication therewith and spanning therebetween. The risers 16 are configured for flow therethrough of water, thereby heating it utilizing solar radiation impinging thereupon. The inlet header 14a is connected to a source of water (e.g., via the external apparatus), which it supplies to the risers 16; the outlet header 14b is connected to the risers to collect water heated therein, and to supply it, for example returning it to the water source.

The headers 14 and risers 16 may be made of any suitable material, such as a polyolefin. In addition, the headers 14 and/or risers 16 may be provided with a suitable coating, for example a spectrally selective coating, such as a thickness insensitive spectrally selective coating, having a high solar absorption (for example more than about 0.90) and low thermal emissivity (for example less than about 0.20). The coating may be applied over the entire exterior surface of the headers 14 and risers 16, or only on upwardly-facing surfaces thereof. In the latter case, a second coating having a low thermal emissivity, for example lower than that of the selective coating applied to the upwardly-facing surfaces, may be applied to downwardly-facing surfaces.

Several inlet headers 14a may be connected to each other, e.g., serially, to receive water from a single point of connection; similarly, several outlet headers 14b may be connected to each other, e.g., serially, to supply water to a single point of supply.

Figure 2A:
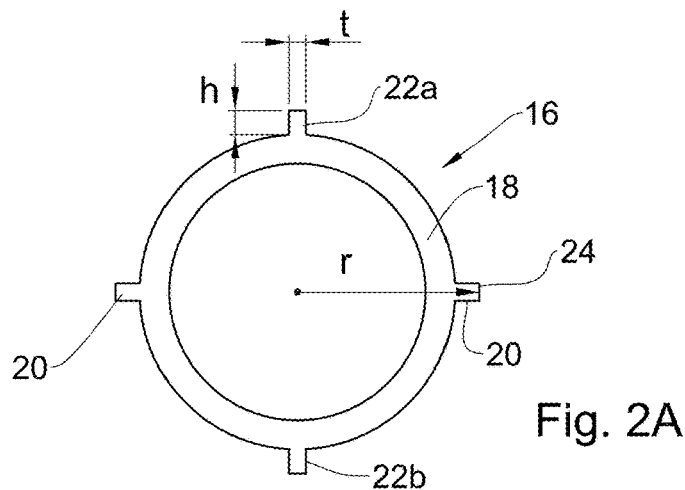
FIG. 2A is a cross-sectional view of a riser of the panel, taken along line II-II in FIG. 1B.

The risers 16 are arranged parallely to one another, and each constitutes a separate element. As better seen in FIG. 2A, each riser 16 is formed with a generally round wall 18 defining therein a fluid path. Longitudinally extending fins 20 are provided projecting sidewardly therefrom, for example opposite (angularly separated by 180°) one another, and longitudinal extending upper and lower baffles 22a, 22b are formed projecting, respectively, upwardly and downwardly therefrom. (It will be appreciated that herein the disclosure and claims, terms relating to direction, such as "up," "down," "side," etc., and similar/related terms are used with reference to the orientation in the accompanying drawings based on a typical installation.) The baffles 22a, 22b may be formed halfway between the fins 20, such that each of the projections (i.e., the fins and baffles) is angularly separated from an adjacent projection by 90°.

Each of the fins 20 comprises a contacting surface 24, which is typically the distal-most one. The contacting surface 24 is generally planar along the length of the fin 20, and is disposed such that it is perpendicular to the radius r of the riser 16 at the midpoint of its length. The significance of this will be discussed below.

Figure 2B:
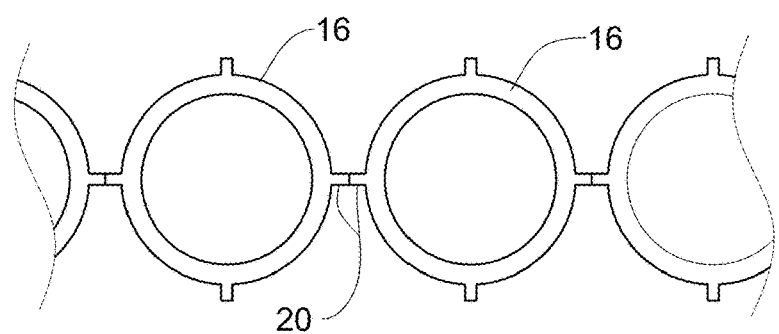
FIG. 2B is a cross-sectional view of several risers of the panel, taken along line II-II in FIG. 1B.

As illustrated in FIG. 2B, the risers 16 are disposed such that each of the fins 20 (with the optional exception of right- and left-most fins of the panel 12) contacts a fin of an adjacent riser. The contact of the fins 20 closes the gap between risers 16, thereby obstructing airflow between adjacent risers, mitigating its cooling effect. It further maximized the area impinged upon by solar radiation, increasing heating.

As the risers 16 are each separate elements, they may yield in a strong wind, flexing vertically thus giving rise to gaps therebetween. This allows wind to pass therethrough, thus reducing the force applied thereby, and reducing the required strength to mount the panels 12 to a surface, simplifying installation. The disposition of the contacting surfaces 24, i.e., being planar and perpendicular to the radius of the riser 16, facilitates separation of the risers, as adjacent fins 20 bear against each other a minimal amount when the risers flex vertically.

Additionally, it has been found that the upper baffles 22a reduce the cooling effect of a wind transverse to the risers 16. This may be owing to a layer of air, moving slowly relative to the speed of the wind, which develops over the risers 16 in the presence of the upper baffles 22a. Such an effect is reduced or absent in similar risers 16 lacking upper baffles 22a. It will be appreciated that while such an effect may be observed below the risers 16 in the presence of the lower baffles 22b, it is typically not as pronounced; the lower baffles 22b may be provided nonetheless in order to simplify construction and/or installation of the risers 16.

The fins 20 may be formed having any suitable dimensions. For example, they may be formed according to one or more of the following:

- the thickness t thereof (i.e., the dimension in a direction perpendicular to the radius of the riser) is between about 40% and 60% of the thickness of the wall 18 of the riser 16;
- the height h thereof (i.e., the dimension in a direction parallel to the radius of the riser) is between about 50% and 100% of the thickness of the riser wall; and
- the thickness t is at least about 50% of the height h thereof.

The baffles 22a, 22b may be formed according to the same parameters. According to some examples, the fins 20 and baffles 22a, 22b are all formed with the same dimensions.

These parameters, alone or in combination, may be selected, for example, to diminish the rate of heat loss from the water, to increase the amount of solar radiation which is used to heat water, maintain required flexibility of the risers 16, or to address any other relevant factor.

Reverting to FIGS. 1A and 1B, and as better seen in FIG. 3A, each of the panels 12 may comprise one or more support elements 26, configured for facilitating maintaining the risers 16 in their respective positions. In addition, they may facilitate maintaining the risers is a position elevated above the surface to which the system 10 is mounted, thereby allowing drainage of water, etc., therefrom.

Each support element 26 is disposed substantially transverse to the risers 16, and comprises a gripping portion 28 having a plurality of seats 30, each for receiving therein a riser 16. Each seat 30 is defined between two upwardly-projecting dividers 32, each of which terminates in an outwardly-rounded head 34, which facilitates simple introduction of the riser 16 thereto, and maintaining it therewithin.

The support elements 26 may further comprise a mounting arrangement 36, for example comprising a plurality of through-going apertures 38, facilitating its use with external hardware (not illustrated) to attach the support element on a surface.

As illustrated in FIG. 3B, the risers 16 may be free of fins 20 and baffles 22a, 22b projecting therefrom, thereby giving rise to gaps 40, on portions thereof which are within the gripping portions 28 of the support elements 26, thus facilitating their introduction thereto. According to some examples (not illustrated), the baffles 22a, 22b may extend through portions of the risers 16 which are within the gripping portions 28 of the support elements 26, i.e., with only the fins 20 having gaps 40 therebetween. Accordingly, the support element 26 may be modified for this purpose, e.g., having seats 30 shaped so as to accommodate the lower baffles 22b therein.

As illustrated in FIGS. 4 and 5, each of the headers 14 comprises a wall 42 defining therein a fluid path, spanning between connection portions 44 at ends thereof. The wall 42 further defines an interface portion 46 of the header 14, formed such that a lateral cross-section thereof has at least one non-convex exterior portion 48. According to some examples, as illustrated in the accompanying drawings, the non-convex exterior portion 48 is generally flat, imparting a generally D-shape to the interface portion 46, i.e., having a flat portion (i.e., the non-convex exterior portion) spanning between edges of an arcuate portion. However, any suitable shape which provides a suitable non-convex exterior portion 48 may be provided without departing from the scope of the presently disclosed subject matter.

The headers 14 each comprise a plurality of openings 50, facilitating bringing the fluid paths of the header and risers 16 into fluid communication with each other. The openings 50 may be formed in the non-convex exterior portion 48, as illustrated, or in any other suitable portion of the header 14. A pair of parallely-disposed ridges 52 may be provided, one on either side of the openings 50, defining therebetween a channel 54 in which the openings are formed. The width of the channel 54 (i.e., the perpendicular distance between the ridges 52) may be such so as to snuggly receive therein ends of the risers 16.

The connection portions 44 are configured to facilitate connection of each header 14 to another element for fluid communication therewith. The element may be another header 14, thus facilitating attaching headers 14 of adjacent panels 12 to one another, or another pipe or conduit, for example to facilitate connection to the external apparatus for receiving therefrom and supplying thereto water.

Figure 6:
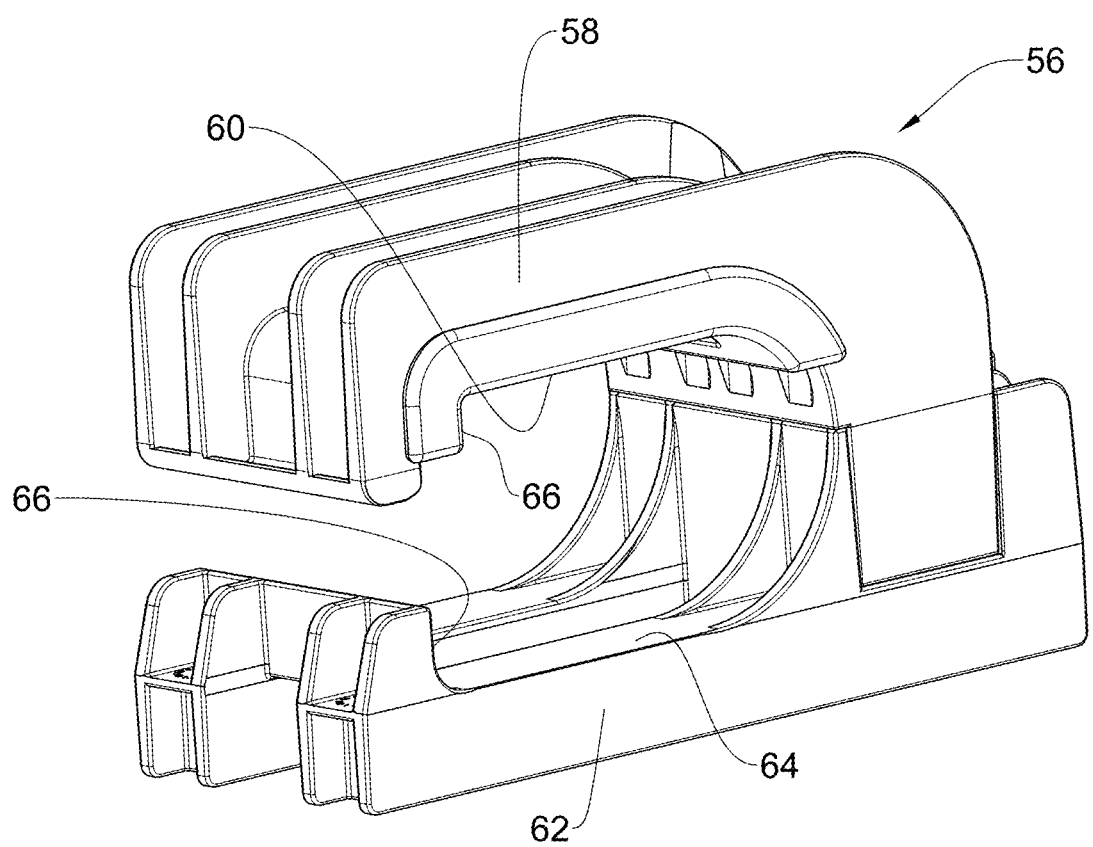
FIG. 6 is a perspective view of a mounting clamp of the system illustrated in FIG. 1A.

Reverting to FIG. 1A, and as better seen in FIG. 6, the system 10 further comprises several mounting clamps 56 configured for retaining therein the headers 14. It will be appreciated that when several panels 12 are attached together, such as illustrated in FIG. 1A, mounting clamps 56 need not be provided on all of the headers 14, only as many as necessary to securely mount it to a surface.

The mounting clamps 56 each comprise an upper jaw 58 having a downwardly-facing interface surface 60, a lower jaw 62 having an upwardly-facing interface surface 64, and each jaw having an inwardly-facing interface surface 66. When a header 14 is received within the mounting clamps 56, the inwardly-facing interface surfaces 66 near against the non-convex exterior portion 48 thereof, thus preventing the header from rotating therewithin.

It will be appreciated that a panel 12 may be provided with risers 16 as described above with reference to FIGS. 2A and 2B (optionally with support elements 26 are described above with reference to FIGS. 3A and 3B), but with headers which are provided differently than described above with reference to FIGS. 4 and 5, without departing from the scope of the presently disclosed subject matter, mutatis mutandis. Similarly, a panel 12 may be provided with headers 14 as described above with reference to FIGS. 4 and 5 risers, but with risers which are provided differently than described above with reference to FIGS. 2A and 2B, without departing from the scope of the presently disclosed subject matter, mutatis mutandis.

Those skilled in the art to which this invention pertains will readily appreciate that numerous changes, variations and modifications can be made without departing from the scope of the invention mutatis mutandis.

The invention claimed is:

1. A solar water-heating panel comprising a plurality of risers configured for utilizing solar radiation impinging thereon to heat a fluid therein, and each comprising a riser wall defining a fluid path for flow therethrough of the fluid, the panel further comprising one or more headers for facilitating delivery of said fluid between said panel and an external source of the fluid, said risers being parallely-arranged and free of direct attachment to one another, each comprising two longitudinal fins formed opposite one another and each projecting sidewardly therefrom towards an adjacent riser, each of said fins comprising a distal-most contacting surface contacting a distal-most surface of a fin of the adjacent riser, wherein said fins are formed such that said distal-most contacting surfaces are substantially planar and are disposed, in lateral cross-section, perpendicularly to a radius of their respective riser.

2. The panel according to claim 1, wherein the thickness of each of said fins is between 40% and 60% of the thickness of the riser wall.

3. The panel according to claim 1, wherein the height of each of said fins is between 50% and 100% of the thickness of the riser wall.

4. The panel according to claim 1, wherein the thickness of each of said fins is at least 50% of the height thereof.

5. The panel according to claim 1, wherein each of said risers further comprises a baffle formed longitudinally along its exterior and projecting upwardly therefrom.

6. The panel according to claim 5, wherein each of said risers further comprises an auxiliary baffle formed longitudinally along its exterior and projecting downwardly therefrom.

7. The panel according to claim 5, wherein each of said baffles is formed halfway between adjacent risers.

8. The panel according to claim 1, further comprising one or more support elements having a gripping portion retaining therein a plurality of said risers.

9. The panel according to claim 8, wherein exterior portions of said risers within said gripping portion are free of elements projecting therefrom.

10. The panel according to claim 8, wherein said risers are free of said fins along portions within said gripping portion.

11. The panel according to claim 8, wherein each of said support elements further comprises a mounting arrangement configured to facilitate attachment thereof to a surface.

12. The panel according to claim 11, wherein said mounting arrangement comprises a plurality of through-going apertures formed parallely with said risers.

13. The panel according to claim 1, wherein each of said headers is characterized, along at least an interface portion thereof, by a lateral cross-section having at least one non-convex exterior portion.

14. The panel according to claim 13, wherein the lateral cross-section of the exterior of said interface portion is generally D-shaped, thereby defining said non-convex exterior portion.

15. The panel according to claim 13, further comprising one or more mounting clamps retaining at least one of said headers, said mounting clamp comprising an interface surface bearing against said interface portions of said header.

16. A solar water-heating system comprising a plurality of panels according to claim 1.

17. A solar water-heating panel comprising a plurality of risers configured for utilizing solar radiation impinging thereon to heat a fluid therein, and each comprising a riser wall defining a fluid path extending in a longitudinal direction for flow therethrough of the fluid, the panel further comprising one or more headers for facilitating delivery of said fluid between said panel and an external source of the fluid, wherein said risers are parallely-arranged and free of direct attachment to one another, and each comprises a longitudinal fin projecting in a sideward direction therefrom toward and contacting an adjacent riser, said adjacent riser being free of an element obstructing movement of the fin in a lateral direction perpendicular to the longitudinal and sideward directions.

18. A solar water-heating system comprising a plurality of panels according to claim 17.

19. A solar water-heating panel comprising a plurality of risers configured for utilizing solar radiation impinging thereon to heat a fluid therein, and each comprising a riser wall defining a fluid path for flow therethrough of the fluid, the panel further comprising one or more headers for facilitating delivery of said fluid between said panel and an external source of the fluid, said risers being parallely-arranged and separate from one another, each comprising two longitudinal fins formed opposite one another and each projecting sidewardly therefrom towards an adjacent riser, each of said fins comprising a distal-most contacting surface contacting a distal-most surface of a fin of the adjacent riser, wherein said fins are formed such that said distal-most contacting surfaces are substantially planar and are disposed, in lateral cross-section, perpendicularly to a radius of their respective riser, thereby facilitating separation of adjacent risers when at least one of them flexes in a vertical direction being mutually perpendicular to the longitudinal and sideward directions.

\* \* \* \* \*